(12) United States Patent
Grix et al.

(10) Patent No.: US 11,924,280 B2
(45) Date of Patent: Mar. 5, 2024

(54) PROTOCOL AND LINK SELECTION FOR VEHICLE CONTROL ROUTING

(71) Applicant: Ford Global Technologies, LLC, Dearborn, MI (US)

(72) Inventors: Elizabeth Grix, Ferndale, MI (US); Saleh Alkirsh, Dearborn, MI (US); Adam Salowitz, Detroit, MI (US); Daniel Leinbach, Farmington Hills, MI (US); Michael Crimando, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 17/477,974

(22) Filed: Sep. 17, 2021

(65) Prior Publication Data

US 2023/0086171 A1 Mar. 23, 2023

(51) Int. Cl.
| | |
|---|---|
| *H04W 4/20* | (2018.01) |
| *H04L 67/125* | (2022.01) |
| *H04L 69/18* | (2022.01) |
| *H04W 4/48* | (2018.01) |

(52) U.S. Cl.
CPC ............ *H04L 67/125* (2013.01); *H04L 69/18* (2013.01); *H04W 4/20* (2013.01); *H04W 4/48* (2018.02)

(58) Field of Classification Search
CPC ....... H04L 67/00–75; H04L 69/00–08; H04W 4/20; H04W 4/40–48; H04W 12/084; H04W 80/00–12
See application file for complete search history.

(56) References Cited

U.S. PATENT DOCUMENTS

| | | | |
|---|---|---|---|
| 8,892,175 B2 | 11/2014 | Kirsch | |
| 9,894,491 B2 | 2/2018 | Oliver et al. | |
| 2016/0044519 A1* | 2/2016 | Bai ........................ | H04W 84/10 370/252 |
| 2018/0063301 A1* | 3/2018 | Patel ......................... | H04L 1/22 |
| 2020/0189609 A1 | 6/2020 | Lee | |

* cited by examiner

*Primary Examiner* — Ronald Eisner
(74) *Attorney, Agent, or Firm* — Brandon Hicks; Bejin Bieneman PLC

(57) ABSTRACT

A system comprises a computer having a processor and a memory, the memory storing instructions executable by the processor to receive a communication-protocol-agnostic vehicle control request for a vehicle, determine, based on the communication-protocol-agnostic vehicle control request, a vehicle control operation to be executed at the vehicle, identify, from among a plurality of candidate communication-protocol-specific communication links, a communication-protocol-specific communication link via which to send a vehicle control directive to the vehicle, and send the vehicle control directive to the vehicle via the identified communication-protocol-specific communication link to cause the vehicle to execute the vehicle control operation.

20 Claims, 7 Drawing Sheets

PROTOCOL AND LINK SELECTION FOR VEHICLE CONTROL ROUTING

BACKGROUND

Many modern vehicles include remote vehicle control support features that enable users to control aspects of vehicle operations using applications executing on devices such as smartphones. Using such an application, a vehicle's owner may, for example, command the vehicle to unlock its trunk, provide battery charge level data, or perform some other type of operation. A control directive can be sent to the vehicle, via a communication link between the vehicle and the device executing the application, to cause the vehicle to perform the desired operation. If the vehicle and the executing device are mutually capable of communicating according to multiple communication protocols, there may be multiple protocols that are usable to convey the control directive to the vehicle.

DETAILED DESCRIPTION

Figure 1:
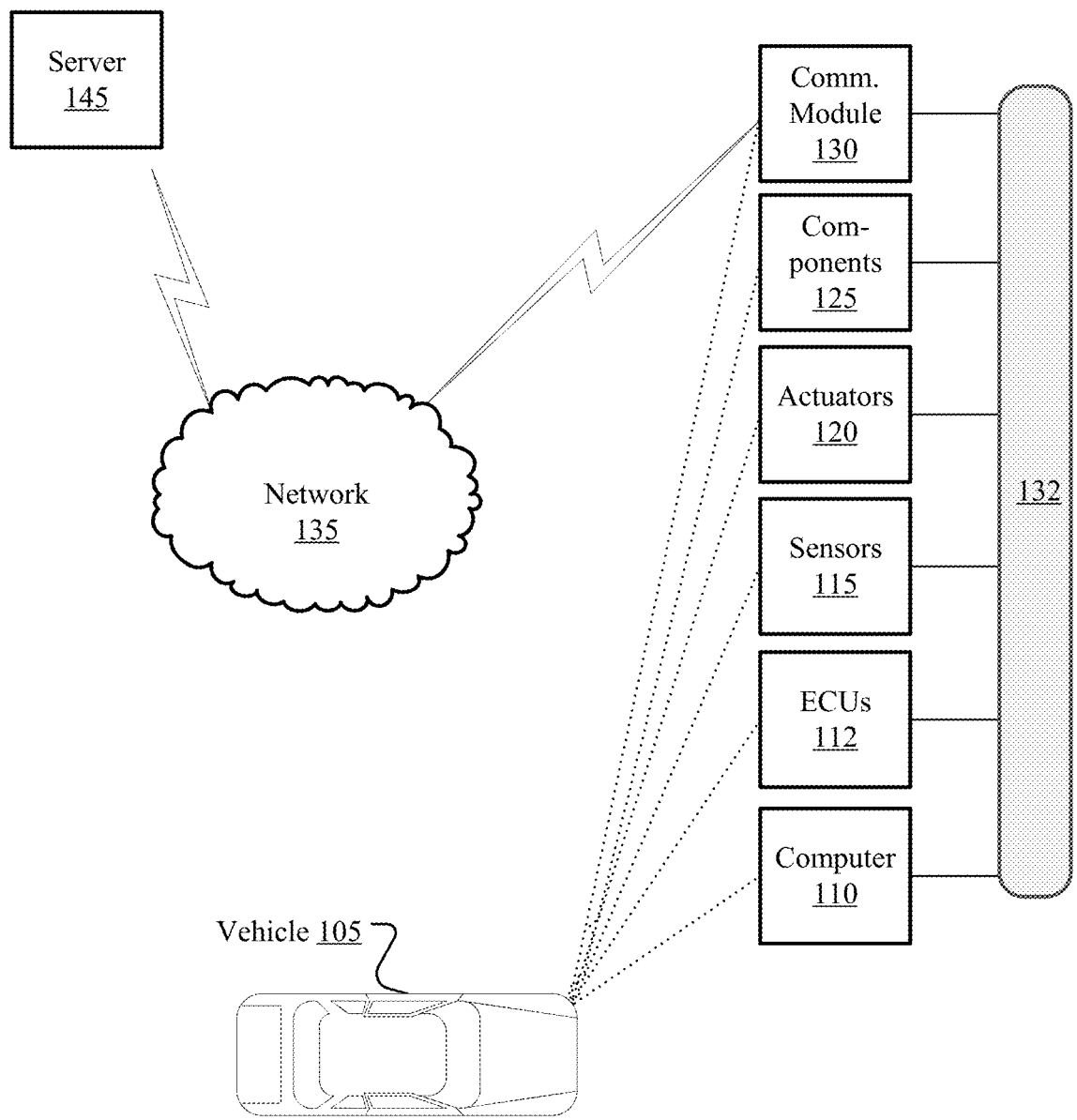
FIG. 1 is a block diagram of an example system.

Disclosed herein is a system for routing vehicle control directives to a vehicle having connectivity via multiple communication links. The system executes a vehicle control user application, to which a user can provide user input to request vehicle control operations for the vehicle. The system also executes vehicle control intermediary programming that can perform link assessments to determine particular communication-protocol-specific communication links to be used to convey vehicle control directives corresponding to requested vehicle control operations. The vehicle control user application can pass communication-protocol-agnostic vehicle control requests to the vehicle control intermediary programming via an application layer interface.

Implementing the vehicle control intermediary programming to accept communication-protocol-agnostic vehicle control requests from vehicle control user applications can improve the efficiency of vehicle control user application creation. Rather than needing to create different respective applications to support different communication protocols, software developers can create unified applications that use a unified interface provided by such vehicle control intermediary programming—which can, for example, be implemented in a "Software Development Kit" (SDK)— to convey vehicle controls via any of multiple protocols. This approach can yield an improved user experience, by rendering questions of protocol selection opaque to the user and allowing the user to use a single application to convey vehicle controls to the vehicle.

A system can comprise a computer having a processor and a memory, the memory storing instructions executable by the processor to receive a communication-protocol-agnostic vehicle control request for a vehicle, determine, based on the communication-protocol-agnostic vehicle control request, a vehicle control operation to be executed at the vehicle, identify, from among a plurality of candidate communication-protocol-specific communication links, a communication-protocol-specific communication link via which to send a vehicle control directive to the vehicle, and send the vehicle control directive to the vehicle via the identified communication-protocol-specific communication link to cause the vehicle to execute the vehicle control operation.

The identifying the communication-protocol-specific communication link can include assessing the set of candidate communication links according to one or more link assessment criteria.

The one or more link assessment criteria can include one or more of a link reliability criterion, a link latency criterion, or a link capacity criterion.

The one or more link assessment criteria can include one or more of a signal strength criterion, a device proximity criterion, or a data cost criterion.

The memory can store instructions executable by the processor to identify an operation type associated with the vehicle control operation and identify the communication-protocol-specific communication link from among the set of candidate communication links based on the operation type.

The identified communication-protocol-specific communication link can comprise a wireless communication link.

The wireless communication link can comprise a wireless local area network (WLAN) link.

The wireless communication link can comprise a cellular radio access network link.

The wireless communication link can comprise a BLUETOOTH or BLUETOOTH Low Energy (LE) link.

The identified communication-protocol-specific communication link can comprise a wired communication link.

The memory can store instructions executable by the processor to receive the communication-protocol-agnostic vehicle control request from a vehicle control user application.

The communication-protocol-agnostic vehicle control request can be received from the vehicle control user application via a communication-protocol-agnostic application layer interface.

The vehicle control operation can include actuating, activating, or deactivating a component of the vehicle.

The vehicle control request can comprise a request for data associated with the vehicle, and the vehicle control operation can include providing the requested data associated with the vehicle.

A method can comprise receiving a communication-protocol-agnostic vehicle control request for a vehicle, determining, based on the communication-protocol-agnostic vehicle control request, a vehicle control operation to be executed at the vehicle, identifying, from among a plurality of candidate communication-protocol-specific communication links, a communication-protocol-specific communication link via which to send a vehicle control directive to the vehicle, and sending the vehicle control directive to the vehicle via the identified communication-protocol-specific communication link to cause the vehicle to execute the vehicle control operation.

The identifying the communication-protocol-specific communication link can include assessing the set of candidate communication-protocol-specific communication links according to one or more link assessment criteria.

The one or more link assessment criteria can include one or more of a link reliability criterion, a link latency criterion, or a link capacity criterion.

The one or more link assessment criteria can include one or more of a signal strength criterion, a device proximity criterion, or a data cost criterion.

The method can comprise identifying an operation type associated with the vehicle control operation and identifying the communication-protocol-specific communication link from among the set of candidate communication-protocol-specific communication links based on the operation type.

The identified communication-protocol-specific communication link can comprise a wireless communication link.

The wireless communication link can comprise a wireless local area network (WLAN) link.

The wireless communication link can comprise a cellular radio access network link.

The wireless communication link can comprise a BLUETOOTH or BLUETOOTH Low Energy (LE) link.

The identified communication-protocol-specific communication link can comprise a wired communication link.

The method can comprise receiving the communication-protocol-agnostic vehicle control request from a vehicle control user application.

The communication-protocol-agnostic vehicle control request can be received from the vehicle control user application via a communication-protocol-agnostic application layer interface.

The vehicle control operation can include actuating, activating, or deactivating a component of the vehicle.

The vehicle control request can comprise a request for data associated with the vehicle, and the vehicle control operation can include providing the requested data associated with the vehicle.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132.

Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, BLUETOOTH, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145 (V2V and V2I may be collectively referred to as V2X). The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using BLUETOOTH, BLUETOOTH Low Energy (BLE), IEEE 802.11, vehicle-to-vehicle (V2V) and cellular V2V (CV2V), cellular V2I or V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
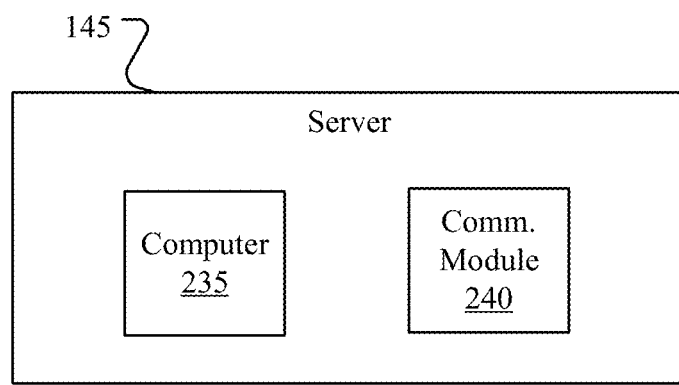
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Figure 3:
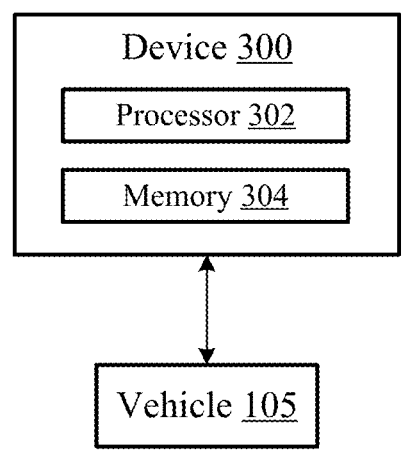
FIG. 3 is a block diagram of an example device.

FIG. 3 is a block diagram of a user device 300, e.g., a smartphone, tablet, laptop computer, or other type of user device. In some implementations, as is discussed further below, device 300 can communicate with vehicle 105 to cause vehicle 105 to perform various types of operations (collectively, "vehicle control operations") in response to user requests. Vehicle control operations are operations initiated by a vehicle computer 110, and can be initiated in response to a request from a device 300 according to vehicle control intermediary programming 410 (described below).

In some implementations, the vehicle control operations can include actuating, activating, or deactivating components of vehicle 105 (e.g., unlocking or locking a trunk, closing or opening a sun roof, etc.). In some implementations, the vehicle control operations can include provision of requested data associated with vehicle 105 (e.g., fuel status, battery charge status, location, etc.).

As shown in FIG. 3, device 300 can include processor 302 and memory 304. Memory 304 includes one or more forms of computer-readable media, and stores instructions executable by the processor for performing various operations, including as disclosed herein. Processor 302 can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). Processor 302 also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, device 300 can include multiple processors (including processor 302), each one of which can be implemented according to any of the examples above.

Figure 4:
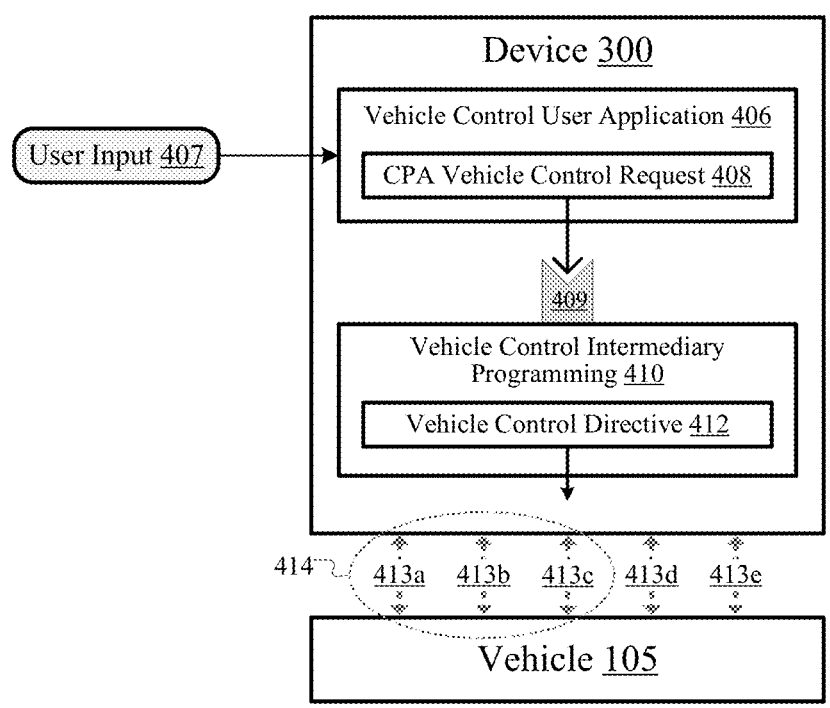
FIG. 4 illustrates further exemplary aspects of the device.

FIG. 4 illustrates further aspects of device 300 according to some implementations. In the example depicted in FIG. 4, device 300 executes (e.g., by processor 302 of FIG. 3) a vehicle control user application 406. Vehicle control user application 406 is an application that a user associated with vehicle 105 can utilize to direct vehicle 105 to execute vehicle control operations, without that user needing to be at the same location as that of vehicle 105.

Device 300 also executes vehicle control intermediary programming 410. Vehicle control intermediary programming 410 is programming that generates and sends control directives to cause vehicle 105 to execute vehicle control operations specified by user inputs to vehicle control user application 406. Vehicle control user application 406 can notify vehicle control intermediary programming 410 of such specified vehicle control operations by sending vehicle control requests to vehicle control intermediary programming 410.

In some implementations, there may be multiple communication protocols according to which device 300 and vehicle 105 are mutually capable of communicating. In such implementations, it may be possible for device 300 and vehicle 105 to establish, and communicate via, respective communication links for each of those multiple communication protocols. Examples of such communication protocols include, without limitation, WiFi, cellular wireless communication standards such as 3$^{rd}$ Generation Partnership Project (3GPP) Long-Term Evolution (LTE), LTE Advanced (LTE-A), and/or 5G New Radio (NR) standards, Bluetooth, Bluetooth Low Energy (LE), Near-Field Communications (NFC), and Universal Serial Bus.

According to some implementations, vehicle control intermediary programming 410 may handle protocol selection and implementation, such that when there are multiple protocols that can potentially be used for communication with vehicle 105, vehicle control intermediary programming 410 determines the protocol and/or link to be used to communicate any particular control directive to vehicle 105. In some implementations, vehicle control intermediary programming 410 can present a communication-protocol-agnostic application layer interface 409, via which vehicle control intermediary programming 410 can receive, from vehicle control user application 406, vehicle control requests that are not specific to any particular communication protocol ("communication-protocol-agnostic vehicle control requests"). In some implementations, upon receipt of a communication-protocol-agnostic vehicle control request from vehicle control user application 406, vehicle control intermediary programming 410 can initiate a vehicle control routing procedure (further discussed below) to identify a communication-protocol-specific communication link via which to send a corresponding vehicle control directive to vehicle 105. Vehicle control intermediary programming 410 can then send the vehicle control directive to vehicle 105 via the identified communication-protocol-specific communication link to cause vehicle 105 to execute the vehicle control operation indicated by the communication-protocol-agnostic vehicle control request.

In the example depicted in FIG. 4, a user associated with vehicle 105 provides user input 407 to vehicle control user application 406 (e.g., using a touchscreen, keypad, or other input feature included in device 300) to specify a vehicle control operation to be executed by vehicle 105. Responsive to receipt of user input 407, vehicle control user application 406 generates a communication-protocol-agnostic (CPA) vehicle control request 408 that indicates the vehicle control operation specified by user input 407, and sends CPA vehicle control request 408 to vehicle control intermediary programming 410 via communication-protocol-agnostic application layer interface 409. Responsive to receipt of CPA vehicle control request 408 from vehicle control user application 406 via communication-protocol-agnostic application layer interface 409, vehicle control intermediary programming 410 can initiate a vehicle control routing procedure to identify a communication-protocol-specific communication link via which to send a corresponding vehicle control directive 412 to vehicle 105. As used herein, the term "communication-protocol-specific communication link" means a communication link (or simply "link"), i.e., a wired and/or wireless path for communications between a first device and a second device, over which communications can be conducted in accordance with a particular communication protocol (e.g., WiFi, cellular, BLUETOOTH, BLUETOOTH LE, NFC, USB, etc.) and cannot be conducted in accordance with other communication protocols.

According to the vehicle control routing procedure, vehicle control intermediary programming 410 can determine a pool, i.e., a set, of potentially utilizable communication-protocol-specific communication links from among which to select the communication-protocol-specific communication link via which to send vehicle control directive 412 to vehicle 105. This link pool can include any communication-protocol-specific communication link that exists (or can be established) between device 300 and vehicle 105, given the respective communication protocols according to which device 300 and vehicle 105 are capable of communicating. In some implementations, the link pool can include a respective communication-protocol-specific communication link for each communication protocol according to which device 300 and vehicle 105 are mutually capable of communicating. In some implementations, the link pool can include multiple communication-protocol-specific communication links associated with a same communication protocol (e.g., both a 2.4 GHz WiFi link and a 5.0 GHz WiFi link). In the example of FIG. 4, the link pool consists of communication-protocol-specific communication links 413a, 413b, 413c, 413d, and 413e.

In some implementations, vehicle control intermediary programming 410 can narrow down the link pool to determine a set of candidate communication-protocol-specific communication links 414. In the example depicted in FIG. 4, candidate communication-protocol-specific communication links 414 include communication-protocol-specific communication links 413a, 413b, and 413c. In some implementations, vehicle control intermediary programming 410 can determine candidate communication-protocol-specific communication links 414 by eliminating from consideration any communication-protocol-specific communication links in the link pool that are unsuitable with respect to the particular purpose of sending vehicle control directive 412 to fulfill CPA vehicle control request 408. For instance, depending on factors such as device proximity, transmission and/or reception power requirements and capabilities, interference, noise, and/or other ambient conditions, it may not be possible to establish and/or utilize some of the potentially utilizable communication-protocol-specific communication links of the link pool when CPA vehicle control request 408 is received, and those links may be eliminated from consideration. According to some implementations, some communication-protocol-specific communication links of the link pool may be eliminated from consideration as being unsuitable for sending vehicle control directive 412 because they cannot accommodate requirements applicable to communicating vehicle control directive 412 (e.g., with respect to security, data rate, payload size, etc.).

In some implementations, vehicle control intermediary programming 410 can identify, from among candidate communication-protocol-specific communication links 414, a communication-protocol-specific communication link (one of communication links 413a, 413b, and 413c in the depicted example) via which to send vehicle control directive 412 to vehicle 105. Vehicle control intermediary programming 410 can then send vehicle control directive 412 to vehicle 105 via the identified communication-protocol-specific communication link to cause vehicle 105 to execute the vehicle control operation indicated by CPA vehicle control request 408.

In some implementations, in conjunction with identifying the communication-protocol-specific communication link via which to send vehicle control directive 412 to vehicle 105, vehicle control intermediary programming 410 can assess candidate communication-protocol-specific communication links 414 according to one or more link assessment criteria.

In some implementations, the link assessment criteria can include a link reliability criterion. Assessing any particular one of candidate communication-protocol-specific communication links 414 according to a link reliability criterion can involve determining an expected reliability of that candidate communication-protocol-specific communication link 414. In some implementations, vehicle control intermediary programming 410 can quantify the expected reliability of the candidate communication-protocol-specific communication link 414 by determining a link reliability parameter for the candidate communication-protocol-specific communication link 414. The link reliability parameter can be a numeric or otherwise quantitative value that represents a relative degree of expected reliability. In some implementations, vehicle control intermediary programming 410 can compare the link reliability parameter to a link reliability threshold to determine whether the candidate communication-protocol-specific communication link 414 is expected to be sufficiently reliable for use in sending vehicle control directive 412. In some implementations, vehicle control intermediary programming 410 can select the link reliability threshold based on the nature of the vehicle control operation indicated by CPA vehicle control request 408. For instance, in some implementations, vehicle control intermediary programming 410 can apply different link reliability thresholds for different vehicle operation types.

In some implementations, the link assessment criteria can include a link latency criterion. Assessing any particular one of candidate communication-protocol-specific communication links 414 according to a link latency criterion can involve determining an expected latency of that candidate communication-protocol-specific communication link 414. In some implementations, vehicle control intermediary programming 410 can quantify the expected latency of the candidate communication-protocol-specific communication link 414 by determining a link latency parameter for the candidate communication-protocol-specific communication link 414. The link latency parameter can be a numeric or otherwise quantitative value that represents an expected latency. In some implementations, vehicle control intermediary programming 410 can compare the link latency parameter to a link latency threshold to determine whether the candidate communication-protocol-specific communication link 414 is expected to exhibit latency that is sufficiently low for the purpose of sending vehicle control directive 412. In some implementations, vehicle control intermediary programming 410 can select the link latency threshold based on the nature of the vehicle control operation indicated by CPA vehicle control request 408. For instance, in some implementations, vehicle control intermediary programming 410 can apply different link latency thresholds for different vehicle operation types.

In some implementations, the link assessment criteria can include a link capacity criterion. Assessing any particular one of candidate communication-protocol-specific communication links 414 according to a link capacity criterion can involve determining an expected capacity (e.g., achievable data rate) of that candidate communication-protocol-specific communication link 414. In some implementations, vehicle control intermediary programming 410 can quantify the expected capacity of the candidate communication-protocol-specific communication link 414 by determining a link capacity parameter for the candidate communication-protocol-specific communication link 414. The link capacity parameter can be a numeric or otherwise quantitative value that represents an expected capacity. In some implementations, vehicle control intermediary programming 410 can compare the link capacity parameter to a link capacity threshold to determine whether the candidate communication-protocol-specific communication link 414 is expected to provide a sufficient amount of capacity for the purpose of sending vehicle control directive 412. In some implementations, vehicle control intermediary programming 410 can select the link capacity threshold based on the nature of the vehicle control operation indicated by CPA vehicle control request 408. For instance, in some implementations, vehicle control intermediary programming 410 can apply different link capacity thresholds for different vehicle operation types.

In some implementations, the link assessment criteria can include a signal strength criterion. Assessing any particular one of candidate communication-protocol-specific communication links 414 according to a signal strength criterion can involve measuring a signal strength of that candidate communication-protocol-specific communication link 414. In some implementations, vehicle control intermediary programming 410 can compare the measured signal strength to a signal strength threshold to determine whether the signal strength of the candidate communication-protocol-specific communication link 414 is sufficiently high for the purpose of sending vehicle control directive 412. In some implementations, the signal strength threshold that vehicle control intermediary programming 410 applies can depend on the communication protocol underlying the candidate communication-protocol-specific communication link 414 being assessed.

In some implementations, the link assessment criteria can include a device proximity criterion. Assessing any particular one of candidate communication-protocol-specific communication links 414 according to a device proximity criterion can involve estimating a distance of separation between device 300 and vehicle 105 (e.g., by comparing GPS coordinates). In some implementations, vehicle control intermediary programming 410 can compare the estimated distance of separation to a threshold to determine whether device 300 and vehicle 105 are sufficiently close to utilize the candidate communication-protocol-specific communication link 414 being assessed. In some implementations, the threshold applied can depend on the communication protocol underlying the candidate communication-protocol-specific communication link 414 being assessed. In some implementations, for example, a lower threshold may be applied if the candidate communication-protocol-specific communication link 414 is a Near-Field Communication (NFC) link than would be applied if the candidate communication-protocol-specific communication link 414 were a cellular radio access network link.

In some implementations, the link assessment criteria can include a data cost criterion. Assessing any particular one of candidate communication-protocol-specific communication links 414 according to a data cost criterion can involve estimating a cost associated with using that candidate communication-protocol-specific communication link 414 to send vehicle control directive 412. For example, if the candidate communication-protocol-specific communication link 414 is a cellular radio access network link, vehicle control intermediary programming 410 can estimate a cost associated with using the candidate communication-protocol-specific communication link 414 to send vehicle control directive 412 based on an amount of data comprised in vehicle control directive 412 and a per-unit cost for data transmission according to a cellular data plan applicable to vehicle 105.

In some implementations, vehicle control intermediary programming 410 can identify the communication link via which to send vehicle control directive 412 to vehicle 105 based on an operation type associated with the vehicle control operation indicated by CPA vehicle control request 408. In some implementations, for instance, in selecting a communication link from among candidate communication-protocol-specific communication links 414, vehicle control intermediary programming 410 may consider whether the indicated vehicle control operation is of an operation type with respect to which vehicle 105 is expected to send data to device 300 in response to vehicle control directive 412. If the vehicle control operation is of a type according to which vehicle 105 is expected to send data to device 300, vehicle control intermediary programming 410 may select a different one of candidate communication-protocol-specific communication links 414 than it would if the vehicle control operation is of another type (e.g., and operation type according to which vehicle 105 is expected to actuate, activate, or deactivate a component of vehicle 105).

Figure 5:
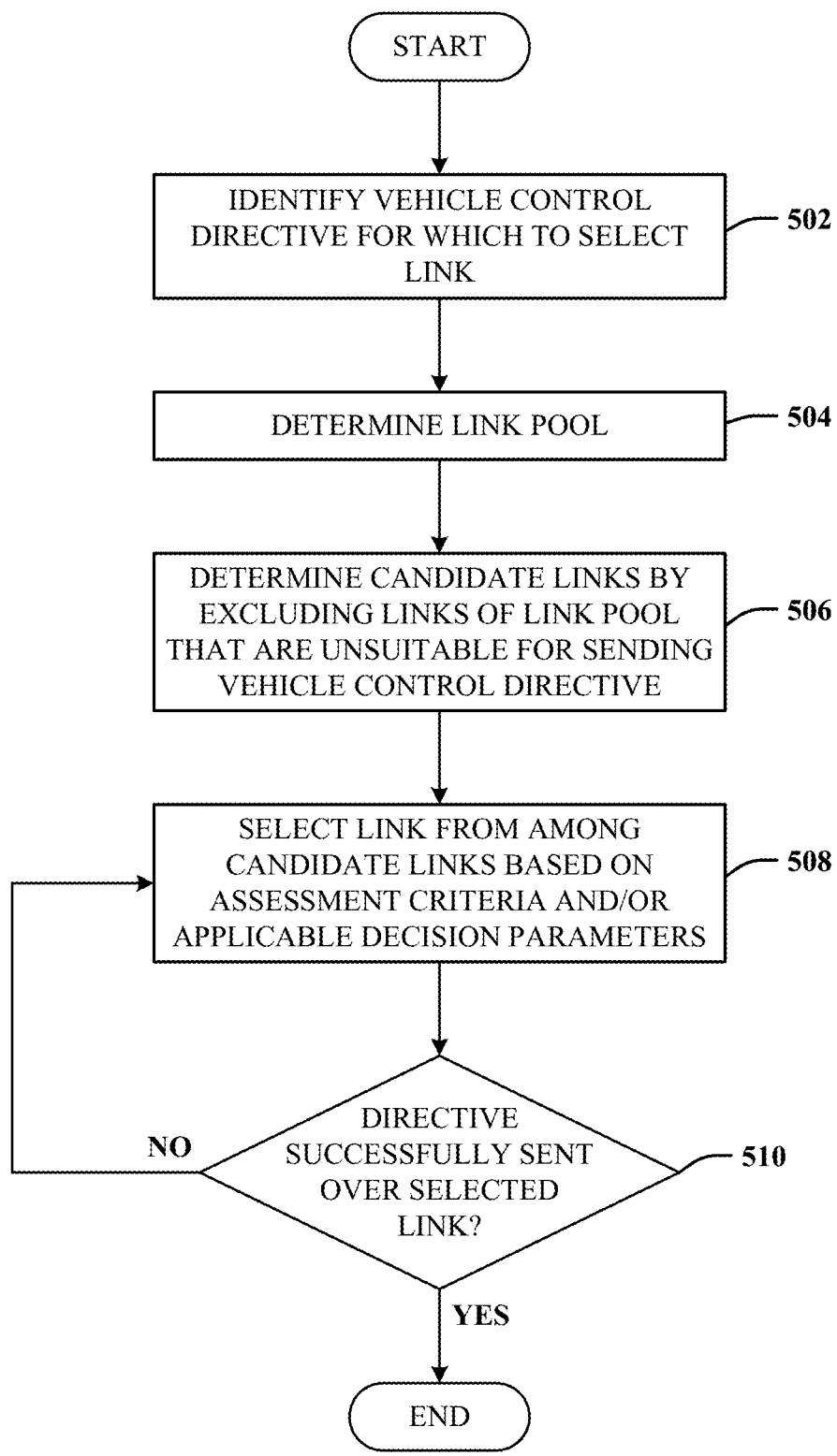
FIG. 5 is a block diagram of a first example process flow.

FIG. 5 is a block diagram of a process flow 500 that may be executed in example implementations to identify a communication-protocol-specific communication link via which to send a vehicle control directive to a vehicle. According to process flow 500, a vehicle control directive for which to select a communication-protocol-specific communication link is identified at 502. For example, vehicle control intermediary programming 410 of FIG. 4 can identify vehicle control directive 412 as a vehicle control directive for which to select a communication-protocol-specific communication link. At 504, a link pool from among which to select the communication-protocol-specific communication link is determined. For example, vehicle control intermediary programming 410 of FIG. 4 can select a link pool from among which to select the communication-protocol-specific communication link over which to send vehicle control directive 412.

At 506, a set of candidate communication-protocol-specific communication links is determined by excluding from consideration links of the link pool that are unsuitable for sending the vehicle control directive. For example, vehicle control intermediary programming 410 of FIG. 4 can identify candidate communication-protocol-specific communication links 414 by excluding links 413d and 413e as being unsuitable for sending vehicle control directive 412. In some implementations, one or more links can be excluded at 506 because they cannot be established and utilized in a timely enough fashion for the purpose of sending the vehicle control directive. In some implementations, one or more links can be excluded at 506 because they cannot accommodate requirements applicable to communicating the vehicle control directive (e.g., with respect to security, data rate, payload size, etc.).

At 508, a communication-protocol-specific communication link is selected from among the candidate links based on link assessment criteria and/or applicable decision parameters. For example, vehicle control intermediary programming 410 of FIG. 4 may select a communication-protocol-specific communication link from among candidate communication-protocol-specific communication links 414 based on one or more link assessment criteria and/or decision parameters applicable to selection of the communication-protocol-specific communication link over which to send vehicle control directive 412. In some implementations in which the communication-protocol-specific communication link is selected at 508 based on link assessment criteria, assessing the candidate links according to the criteria can involve comparing associated threshold values with observed or expected parameter values (e.g., comparing an estimated link latency with a link latency threshold). In some implementations in which the communication-protocol-specific communication link is selected at 508 based on applicable decision parameters, those applicable decision parameters can include defined priorities (e.g., prioritization of one protocol over another), rulesets (e.g., a set of rules mapping various vehicle control types to respective preferred protocols), and/or constraints (e.g., cellular links not to be used while a device is roaming). That is, as will be appreciated, parameters and thresholds, e.g., a quality of service metric or metrics such as latency, throughput, drops, etc., could be determined based on an application and/or message for which a link is used, e.g., more critical messages could have more limiting thresholds.

At 510, it is determined whether the vehicle control directive has been successfully sent over the communication-protocol-specific communication link selected at 508. For example, vehicle control intermediary programming 410 of FIG. 4 can determine whether vehicle control directive 412 has been successfully sent over a communication-protocol-specific communication link selected at 508. If the vehicle control directive has not been successfully sent over the selected communication-protocol-specific communication link, a different communication-protocol-specific communication link is selected at 508 from among the candidate links identified at 506. Once the vehicle control directive has been successfully sent, the process flow ends.

Figure 6:
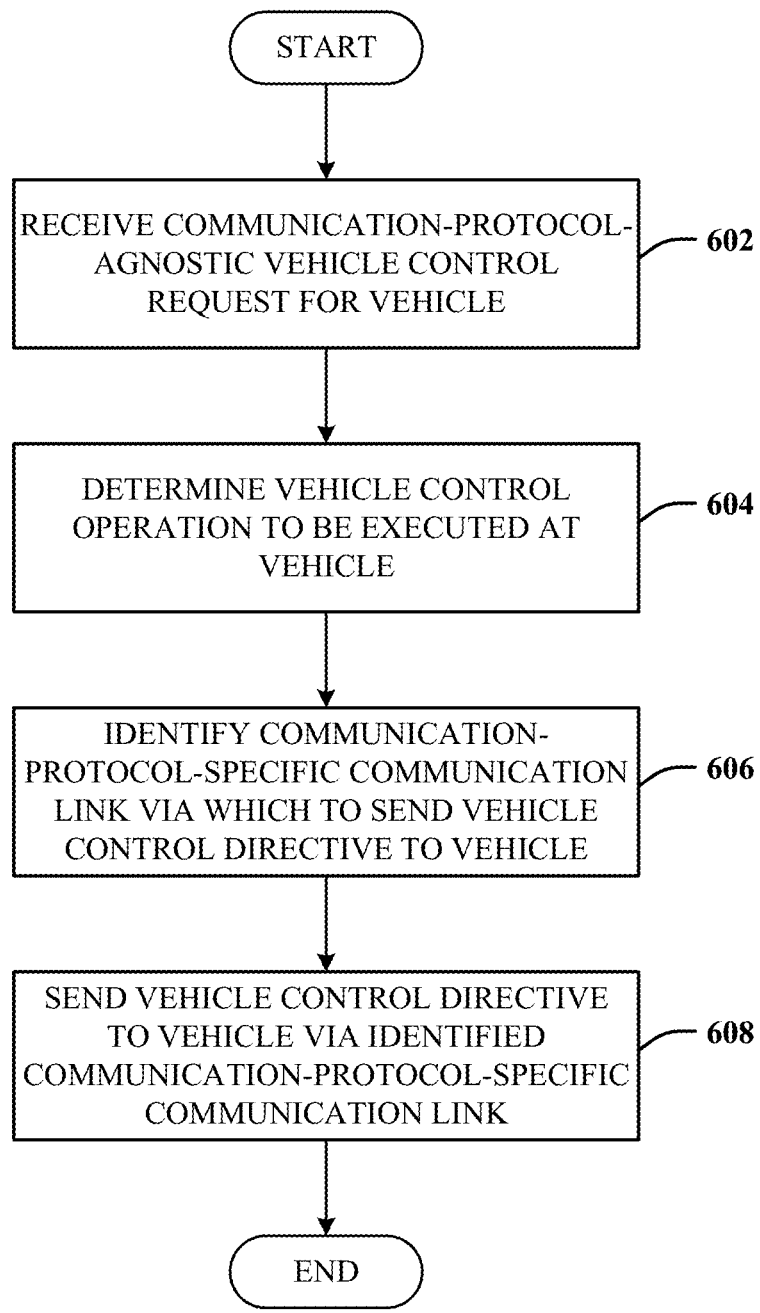
FIG. 6 is a block diagram of a second example process flow.

FIG. 6 is a block diagram of a process flow 600 that may be executed in example implementations. According to process flow 600, a communication-protocol-agnostic vehicle control request for a vehicle is received at 602. For example, vehicle control intermediary programming 410 of FIG. 4 can receive CPA vehicle control request 408 from vehicle control user application 406 via communication-protocol-agnostic application layer interface 409. At 604, a vehicle control operation to be executed at the vehicle is determined based on the communication-protocol-agnostic vehicle control request received at 602. For example, vehicle control intermediary programming 410 of FIG. 4 can determine a vehicle control operation to be executed at vehicle 105 based on CPA vehicle control request 408.

At 606, a communication-protocol-specific communication link via which to send a vehicle control directive to the vehicle is identified from among a plurality of candidate communication-protocol-specific communication links. For example, vehicle control intermediary programming 410 of FIG. 4 can identify a communication-protocol-specific communication link via which to send vehicle control directive 412 to vehicle 105 from among candidate communication-protocol-specific communication links 414. According to some implementations, the identification of the communication-protocol-specific communication link at 606 may be accomplished via application of process flow 500 of FIG. 5. At 608, the vehicle control directive may be sent to the vehicle via the identified communication-protocol-specific communication link to cause the vehicle to execute the vehicle control operation determined at 604. For example, vehicle control intermediary programming 410 of FIG. 4 can send vehicle control directive 412 to vehicle 105 via a communication-protocol-specific communication link identified from among candidate communication-protocol-specific communication links 414 to cause vehicle 105 to execute the vehicle control operation indicated by CPA vehicle control request 408.

Figure 7:
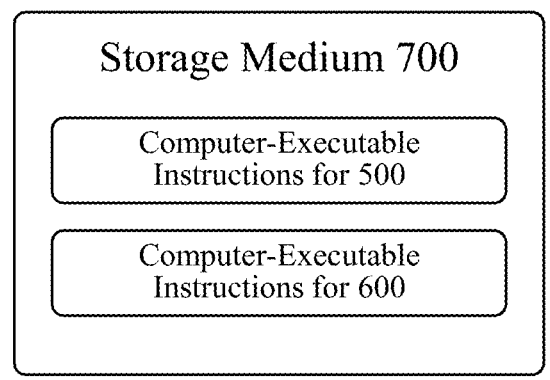
FIG. 7 is a block diagram of an example storage medium.

FIG. 7 illustrates an example storage medium 700. Storage medium 700 may be any non-transitory computer-readable storage medium or machine-readable storage medium, such as an optical, magnetic or semiconductor storage medium. In various implementations, storage medium 700 may be an article of manufacture. In some implementations, storage medium 700 may store computer-executable instructions, such as computer-executable instructions to implement one or both of process flow 500 of FIG. 5 and process flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
a computer having a processor and a memory, the memory storing instructions executable by the processor to:
receive a communication-protocol-agnostic vehicle control request for a vehicle;
determine, based on the communication-protocol-agnostic vehicle control request, a vehicle control operation to be executed at the vehicle;
identify, from among a plurality of candidate communication-protocol-specific communication links, a communication-protocol-specific communication link via which to send a vehicle control directive to the vehicle; and
send the vehicle control directive to the vehicle via the identified communication-protocol-specific communication link to cause the vehicle to execute the vehicle control operation.

2. The system of claim 1, the identifying the communication-protocol-specific communication link including assessing the plurality of candidate communication-protocol-specific communication links according to one or more link assessment criteria.

3. The system of claim 2, the one or more link assessment criteria including one or more of: a link reliability criterion; a link latency criterion; a link capacity criterion; a signal strength criterion; a device proximity criterion; or a data cost criterion.

4. The system of claim 1, the memory storing instructions executable by the processor to: identify an operation type associated with the vehicle control operation;
and identify the communication-protocol-specific communication link from among the plurality of candidate communication-protocol-specific communication links based on the operation type.

5. The system of claim 1, the identified communication-protocol-specific communication link comprising a wireless local area network (WLAN) link, a cellular radio access network link, a BLUETOOTH link, or a BLUETOOTH Low Energy (LE) link.

6. The system of claim 1, the identified communication-protocol-specific communication link comprising a wired communication link.

7. The system of claim 1, the memory storing instructions executable by the processor to receive the communication-protocol-agnostic vehicle control request from a vehicle control user application.

8. The system of claim 7, the communication-protocol-agnostic vehicle control request received from the vehicle control user application via a communication-protocol-agnostic application layer interface.

9. The system of claim 1, the vehicle control operation including actuating, activating, or deactivating a component of the vehicle.

10. The system of claim 1, the communication-protocol-agnostic vehicle control request comprising a request for data associated with the vehicle, the vehicle control operation including providing the requested data associated with the vehicle.

11. A method, comprising:
receiving a communication-protocol-agnostic vehicle control request for a vehicle;
determining, based on the communication-protocol-agnostic vehicle control request, a vehicle control operation to be executed at the vehicle;
identifying, from among a plurality of candidate communication-protocol-specific communication links, a communication-protocol-specific communication link via which to send a vehicle control directive to the vehicle; and
sending the vehicle control directive to the vehicle via the identified communication-protocol-specific communication link to cause the vehicle to execute the vehicle control operation.

12. The method of claim 11, the identifying the communication-protocol-specific communication link including assessing the plurality of candidate communication-protocol-specific communication links according to one or more link assessment criteria.

13. The method of claim 12, the one or more link assessment criteria including one or more of: a link reliability criterion; a link latency criterion; a link capacity criterion; a signal strength criterion; a device proximity criterion; or a data cost criterion.

14. The method of claim 11, comprising: identifying an operation type associated with the vehicle control operation;
and identifying the communication-protocol-specific communication link from among the plurality of candidate communication-protocol-specific communication links based on the operation type.

15. The method of claim 11, the identified communication-protocol-specific communication link comprising a wireless local area network (WLAN) link, a cellular radio access network link, a BLUETOOTH link, or a BLUETOOTH Low Energy (LE) link.

16. The method of claim 11, the identified communication-protocol-specific communication link comprising a wired communication link.

17. The method of claim 11, comprising receiving the communication-protocol-agnostic vehicle control request from a vehicle control user application.

18. The method of claim 17, the communication-protocol-agnostic vehicle control request received from the vehicle control user application via a communication-protocol-agnostic application layer interface.

19. The method of claim 11, the vehicle control operation including actuating, activating, or deactivating a component of the vehicle.

20. The method of claim 11, the communication-protocol-agnostic vehicle control request comprising a request for data associated with the vehicle, the vehicle control operation including providing the requested data associated with the vehicle.

* * * * *